(12) United States Patent
Weller

(10) Patent No.: US 6,350,797 B1
(45) Date of Patent: Feb. 26, 2002

(54) USE OF CYCLIC SULFUR SILANES AS COUPLING AGENTS IN SULFUR-VULCANIZABLE, SILICA-REINFORCED TIRE RUBBER COMPOSITIONS

(75) Inventor: Keith J. Weller, Yonkers, NY (US)

(73) Assignee: Crompton Corporation, Middlebury, CT (US)

( * ) Notice: Subject to any disclaimer, the term of this patent is extended or adjusted under 35 U.S.C. 154(b) by 0 days.

(21) Appl. No.: 09/469,926

(22) Filed: Dec. 22, 1999

(51) Int. Cl.$^7$ .......................... C08K 5/45; C08C 19/20; C08F 8/36
(52) U.S. Cl. .......................... 524/82; 524/84; 524/85; 525/331.9; 525/333.1; 525/354
(58) Field of Search .................. 524/82, 84, 85; 525/331.9, 333.1, 354

(56) References Cited

U.S. PATENT DOCUMENTS 4,100,172 A * 7/1978 Mui et al. ............... 260/327 H
5,110,969 A * 5/1992 Dittrich et al. ............. 556/427

* cited by examiner

Primary Examiner—David W. Wu
Assistant Examiner—Kelechi Egwim
(74) Attorney, Agent, or Firm—Michael P. Dilworth

(57) ABSTRACT

New sulfur-vulcanizable, silica-reinforced tire rubber compositions and tires and tire parts, vulcanized and unvulcanized, made employing them are made with coupling agent compositions comprising a sulfur-containing norbornanyl silicon compound of the structure $[S_y—R]_n—SiX_{4-n}$ wherein each X is chosen from monovalent hydrocarbon groups or hydrolyzable groups; y is 1 to 5 when y is 1 the compound is an episulfide, and when y is 2 to 5 the sulfur atoms form a polysulfide wherein each sulfur atom is bonded to another sulfur atom and the terminal valences of the polysulfide are bonded to vicinal carbon atoms; n is 1, 2 or 3; R is a polyvalent polycycloaliphatic hydrocarbon radical. Tires made with these compositions exhibit a desirable combination of properties, including reduced rolling resistance and road noise and maintained or improved modulus, wet traction and abrasion resistance.

26 Claims, No Drawings

USE OF CYCLIC SULFUR SILANES AS COUPLING AGENTS IN SULFUR-VULCANIZABLE, SILICA-REINFORCED TIRE RUBBER COMPOSITIONS

BACKGROUND OF THE INVENTION

The invention relates to use of certain sulfur-containing silanes in sulfur-vulcanizable, silica-reinforced tire rubber compositions to provide a coupling agent with a high ratio of sulfur to silicon. In its more preferred aspects, the use of certain cyclic sulfur silanes in tire rubber compositions of this type produces tires exhibiting reduced rolling resistance and maintained or improved wet traction, modulus and abrasion resistance.

Rubber compositions for tire treads have traditionally employed carbon black as a principal reinforcing filler. However, due to recent increased demands for fuel efficiency and performance, the use of silica instead of carbon black has become more prevalent as a principal filler. In some cases, the use of silica in tire treads has been found to give lower rolling resistance without sacrificing abrasion resistance, modulus, or wet traction. However, in order for silica to be an effective reinforcing filler, an effective coupling agent is required. In this regard, see U.S. Pat. Nos. 3,451,458; 3,664,403; 3,768,537; 3,884,285; 3,938,574; 4,482,663; 4,519,430; 4,590,052; 5,066,721; 5,089,554; and 5,753,732 and British Patent No. 1,424,503. The coupling agents most often used in practice are polysulfide silanes of a type such as Silquest® A-1289 silane, which is a bis-3-(triethoxysilylpropyl)tetrasulfide silane, or Silquest® A-1589 silane, which is a bis-3-(triethoxysilylpropyl) disulfide silane. As has been established by a great deal of testing, not all coupling agents are effective in achieving the sometimes competing objectives of the present invention.

There is a need for the development of sulfur-vulcanizable, silica-reinforced tire rubber compositions that can employ silanes other than a limited group commercially available and known to give improvements in rolling resistance without having a detrimental impact on other properties. Norbornanylsulfursilanes, or trithiane silanes, are known for use in some applications as coupling agents, although not in tire rubber compositions for treads where their properties are unknown. See, for example, U.S. Pat. No. 4,100,172 to Mui, J. Y. P. and Kanner B., assigned to Union Carbide Corporation, New York, 1978. The previously published syntheses of trithiane silanes are disadvantageous and the advantages of the use of trithiane silane compounds and compositions as coupling agents in sulfur-vulcanizable, silica-reinforced tire rubber compositions has not been known. On the prior art process, see Shields, T. C. and Kurtz, A. N., Journal of the American Chemical Society, 1969, 91, 5415, and Bartlett, P. D. and Ghosh, T., Journal of Organic Chemistry, 1987, 52, 4937.

There remains a need for a process that enables the production of tires and parts such as treads for tires exhibiting reduced rolling resistance and road noise and maintained or improved wet traction, modulus and abrasion resistance, and this is provided by the invention through the use of sulfur silane coupling agent compounds and compositions in sulfur-vulcanizable, silica-reinforced tire rubber compositions.

BRIEF DESCRIPTION OF THE INVENTION

It is an object of the invention to provide an improved process for preparing sulfur-vulcanizable, silica-reinforced tire rubber compositions and tires and tire parts, vulcanized and unvulcanized, made from these compositions.

It is another object of the invention to provide an improved process for preparing sulfur-vulcanizable, silica-reinforced tire rubber compositions and tires and tire parts, vulcanized and unvulcanized, made from these compositions, where tires made from the vulcanized rubber exhibit reduced rolling resistance.

It is another object of the invention to provide an improved process for preparing sulfur-vulcanizable, silica-reinforced tire rubber compositions and tires and tire parts, vulcanized and unvulcanized, made from these compositions, where tires made from the vulcanized rubber exhibit improved modulus.

It is another object of the invention to provide an improved process for preparing sulfur-vulcanizable, silica-reinforced tire rubber compositions and tires and tire parts, vulcanized and unvulcanized, made from these compositions, where tires made from the vulcanized rubber exhibit improved wet traction.

It is another object of the invention to provide an improved process for preparing sulfur-vulcanizable, silica-reinforced tire rubber compositions and tires and tire parts, vulcanized and unvulcanized, made from these compositions, where tires made from the vulcanized rubber exhibit reduced road noise.

It is another object of the invention to provide an improved process for preparing sulfur-vulcanizable, silica-reinforced tire rubber compositions and tires and tire parts, vulcanized and unvulcanized, made from these compositions, where tires made from the vulcanized rubber exhibit improved abrasion resistance.

It is still another object of the invention to provide an improved process for preparing sulfur-vulcanizable, silica-reinforced tire rubber compositions and tires and tire parts, vulcanized and unvulcanized, made from these compositions, where tires made from the vulcanized rubber exhibit reduced rolling resistance and road noise and maintained or improved modulus, wet traction and abrasion resistance.

These and other objects are achieved by the present invention, which provides a process for preparing sulfur-vulcanizable, silica-reinforced tire rubber compositions comprising:

preparing a blend of sulfur-vulcanizable rubber, silica reinforcing filler and a coupling agent comprising a sulfur-containing norbornanyl silicon compound of the structure

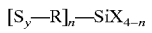

$[S_y-R]_n-SiX_{4-n}$ wherein each X is chosen from monovalent hydrocarbon groups or hydrolyzable groups, including, but not limited to, alkoxy, halide or an oxygen which oxygen in turn is bonded to another silicon atom to form a siloxane; y is 1 to 5, when y is 1 the compound is an episulfide, and when y is 2 to 5 the sulfur atoms form a polysulfide wherein each sulfur atom is bonded to another sulfur atom and the terminal valences of the polysulfide are bonded to vicinal carbon atoms; n is 1, 2 or 3; R is a polyvalent polycycloaliphatic hydrocarbon radical.

Tires and tire parts, vulcanized and unvulcanized, made employing the above rubber compounds are also new.

Many of the preferred aspects of the invention are described below.

DETAILED DESCRIPTION OF THE INVENTION

The following description will illustrate the use of preferred norbornanyl silicon compositions as coupling agents for sulfur-vulcanizable, silica-reinforced tire rubber compositions. Also described will be vulcanized and unvulcanized tire parts and tires employing these compositions. The invention is however, not limited to the specific compositions illustrated. Vulcanized tires made of these compositions and the preforms for preparing them are novel and exhibit improvement in one or more aspects of reduced rolling resistance, reduced road noise, improved modulus, improved wet traction and improved abrasion resistance.

This sulfur containing norbornanyl silicon compounds (cyclic sulfur silanes) used according to the invention are characterized by the following structure (Formula I):

 (Formula I)

wherein each X is chosen from monovalent hydrocarbon groups or hydrolyzable groups, such as alkoxy, halide or an oxygen, which oxygen in turn is bonded to another silicon atom to form a siloxane; y is 1 to 5, when y is 1 the compound is an episulfide, and when y is 2 to 5 the sulfur atoms form a polysulfide wherein each sulfur atom is bonded to another sulfur atom and the terminal valences of the polysulfide are bonded to vicinal carbon atoms; n is 1, 2 or 3; R is a polyvalent polycycloaliphatic hydrocarbon radical including but not limited to the following:

(a)
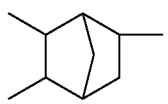

(b)
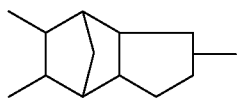

(c)
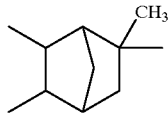

(d)
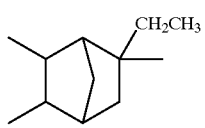

(e)
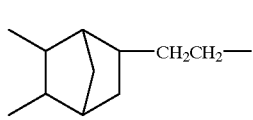

(f)
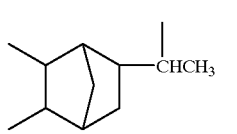

In the above structures, the valencies to the left would be connected to the sulfur so as to form a ring and the valency to the right would be connected to the silicon atom.

Each X may be the same or different. Among the hydrocarbon groups for X are alkyl groups, preferably lower alkyls including from one to four carbons. Among the hydrolyzable X groups are halides, such as chlorine, the lower alkoxy groups, preferably those containing from one to four carbons and siloxanes, such as trimethoxysiloxy and methyldiethoxysiloxy. Mixed alkoxy groups (e.g., one being methoxy and another being ethoxy are a potential embodiment. Dimers of the silane wherein the siloxy group is another thiane silane is contemplated as well, e.g., 1,3-bis[(ethyl)-2-(3,4,5-trithiatricyclo[5.2.1.0$^{2.6}$]decyl)]tetraethoxy disiloxane. The most preferred X groups are ethoxy and methoxy.

The group R can be derived from a variety of polycycloaliphatic compounds containing at least one reactive, strained double bond, such as those represented by Formulas II, III and IV, as follows:

(Formula II)
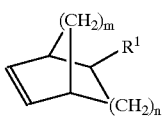

(Formula III)
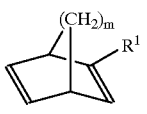

(Formula IV)

Where m=1 or 2, n=0 to 8, R$^1$ is selected from the group of H, C$_1$–C$_{12}$ alkyl, or C$_2$–C$_{12}$ alkenyl group and R$^2$ is a C$_2$–C$_4$ alkene.

Non-limiting examples of the above compounds of Formulas II, III and IV are preferably selected from the group g–k:

(g)

(h)
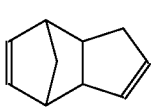

(i)
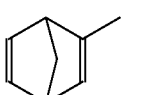

(j)
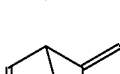

(k)

The sulfur-substituted polycycloaliphatic compounds, as characterized by Formula I, can be produced by the reaction of sulfur from any suitable source with an aliphatically unsaturated precursor of the silicon compound according to Formula Va in the presence of an acid catalyst. Among the suitable sources of sulfur are any of those that are capable of providing sulfur for the reaction under conditions effective to produce the desired products, e.g., any of the allotropes of elemental sulfur, or a compound capable of donating free sulfur, such as, but not limited to, di-n-hexadecyl tetrasulfide, di-carboxymethyl tetrasulfide, di-methyl hexasulfide, bis-(dimethylthiocarbamyl)hexasulfide and bis (triethoxysilylpropyl)tetrasulfide. Preferably, the sulfur source is essentially free of water, more preferably completely free of water. The suitable unsaturated silicon compounds are defined as follows:

$[R^3]_n\text{—SiX}_4\text{-n}$ 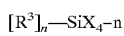 (Formula Va)

where $R^3$ is a polycycloaliphatic group containing at least one reactive strained double bond and X is as defined for Formula I above. Exemplary of the $R^3$ groups for the precursor compounds are groups 1 through q, as follows:

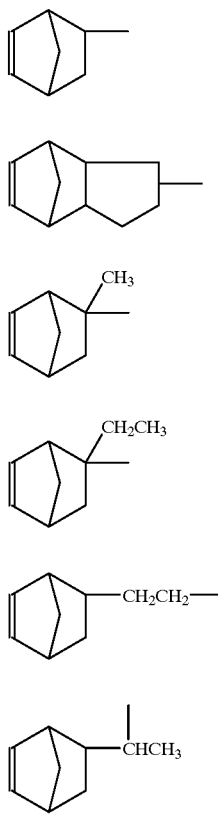

(l)

(m)

(n)

(o)

(p)

(q)

The synthesis of compounds of Formula Va may be made by several routes, preferably the hydrosilation of a compound containing two double bonds such as, but not limited to, those compounds g to k, or from the Diels-Alder type reaction of a vinyl-containing silane with a suitable diene, such as but not limited to, cyclopentadiene, methylcyclopentadiene, dicyclopentadiene and methylcyclopentadiene dimer.

Suitable acid catalysts include common organic acids, such as acid chlorides like acetyl chloride, or inorganic acids, such as hydrochloric. However, the acid will preferably be a silicon compound of Formula Vb containing at least one Si-Cl bond, referred to herein as chlorosilanes, as follows:

$[R^3]_n\text{—SiX}\epsilon_{4-n}$ 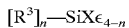 (Formula Vb)

The most preferred catalyst compounds are chlorosilanes of Formula Vb wherein at least one of Xϵ is occupied by a halogen, preferably chlorine, and the remainder are as defined for X, and $R^3$ is a polycycloaliphatic group containing at least one reactive strained double bond as described above.

A typical example of the above reaction is shown in Equation I, as follows:

(Equation I)

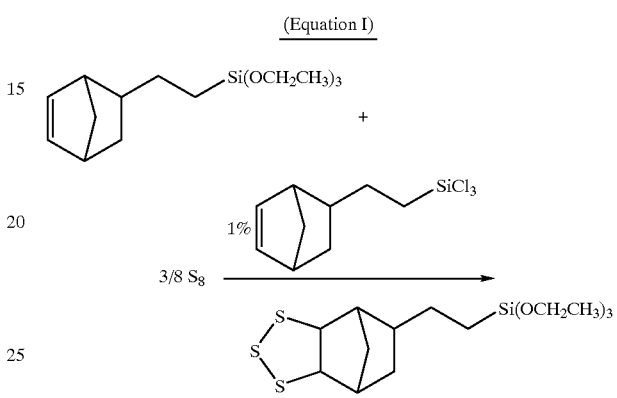

The reaction may be performed without any solvent, but solvents can be employed where they add practical value to the process. The product can be distilled, but in general, this is not necessary, since the reaction proceeds cleanly and in high yield. Among the available solvents are aromatic and aliphatic hydrocarbons, alcohols, ketones and ethers. Among the aromatic hydrocarbons are xylene, toluene, and benzene. Among the aliphatic hydrocarbons are pentane, hexane, octane, isooctane, decane, cyclohexane and methylcyclohexane. Among the alcohols are methanol, ethanol, isopropanol, propanol, butanol, hexanol, octanol and t-butanol. The ketones are represented by methyl ethyl ketone, methyl isopropyl ketone and cyclohexanone. The ethers are represented by tetrahydrofuran, dioxane, dioxolane and glyme. Certain of the solvents with low boiling points might require performing the reaction under elevated pressure.

A general procedure for the synthesis of the sulfur containing norbornanyl silanes of Formula I by the above reaction will entail directly reacting with sulfur, a norbornenylsilane of Formula Va in the presence of a chlorosilane catalyst, in a molar ratio in the range of about 1000:1 to about 10:1. The molar ratio of the norbornenylsilane of Formula Va to moles of sulfur in the sulfur source will be about 1:3 to about 1:4. The reaction temperature is advantageously over 150° C., preferably between 150° C. and 200° C. Preferably, the molar ratio of the norbornenylsilane of Formula Va to chlorosilane is in the range of about 1000:1 to about 100: 1. The process can be performed at any reaction pressure near ambient, preferably from 0.8–1.2 atmospheres. Again, the use of low-boiling solvents may require the use of elevated pressures. The exclusion of water from the reaction by the use of a drying agent in a drying tube, or by the use of inert gases such as nitrogen or argon is the preferred method of the present invention.

Non-limiting examples of compounds of Formula I are shown below:

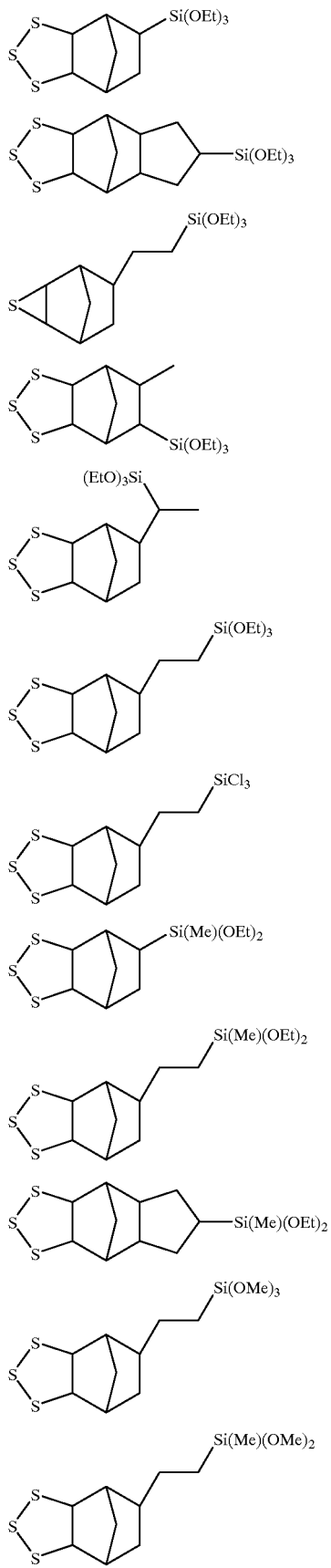
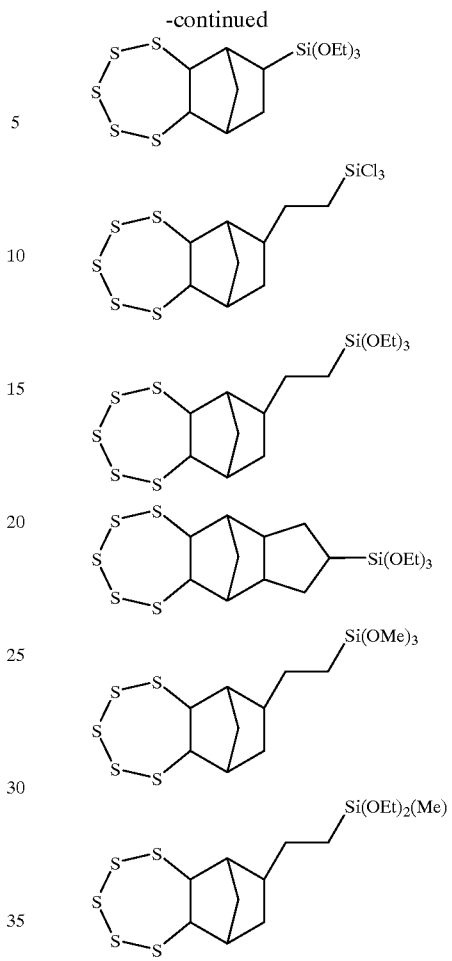

The cyclic sulfur silanes made in the above manner can be directly recovered from the reaction mixture, such as by decanting and/or filtering, if desired. The product will typically have a dark color if no treatment is undertaken, but color and impurities present will not affect its use in rubber compounds prepared by the invention. If desired, the color can be improved by vacuum distillation to produce a light yellow liquid. The products can be utilized in the form as recovered, without the use of additional purification for the new uses identified by the invention without detrimental effect caused by the unpurified product cyclic sulfur silanes or their component impurities.

The cyclic sulfur silanes silane compositions used according to the invention can be made in the manner discussed above and as exemplified in copending application entitled Synthesis Of Cyclic Sulfur Silanes (attorney's docket no. 2062-SIL0046) filed in the names of K. J. Weller and L. Hwang on the same date as this application or in the manner as the products of U.S. Pat. No. 4,100,172, which is hereby incorporated by reference in its entirety. The full disclosure of the copending application is also incorporated by reference. A discovery and an advantage of the present invention is that the liquid reaction mixture of the process described in the noted copending application and above, can be employed to achieve high quality rubber compositions and products with no or little purification.

The cyclic sulfur silane compositions of Formula I are employed in natural and synthetic rubber compositions and blends of known and novel formulation, in amounts consistent with those previously employed for other silane coupling agents for the use in sulfur-vulcanizable, silica-reinforced tire rubber compositions. Exemplary of suitable amounts will be at least 2 parts per hundred parts rubber (PHR) and, preferably from about 4 to about 20 PHR, e.g., 6 to 12 PHR. The amount will also be related to the amount of silica employed, preferably the ratio by weight of silica to silane being in the range of from 4:1 to about 40: 1, more narrowly from about 6:1 to about 10:1. The ratio of the sulfur to the silicon in the compound of Formula I will also play a role in the amount of silane employed. Here, the amount of silane will vary in an inverse relation with the molar ratio of sulfur to silicon, with the higher amounts in the above ranges being required as the molar ratio is decreased from 3:1 to 1:1. The higher molar ratios of sulfur to silicon are preferred and a distinct advantage of this aspect of the invention. Another advantage of the invention, especially when employing these higher molar ratios of sulfur to silicon in the coupling agents, that the use of added sulfur can be eliminated for vulcanization in some applications. However, when used, molar ratios of added sulfur for vulcanization to sulfur in the silane can be varied within the range of from above 0 to about 100:1 or more, preferably from 2:1 to 20:1, more narrowly from 5:1 to 10:1. The required amount of silane will decrease as its relative sulfur content increases.

The Cyclic Sulfur Silanes may be used neat as a liquid or may be loaded onto a carrier so that they may be delivered as dry particulates to the rubber composition. Suitable carriers include porous polymers, high surface area silica and carbon black.

The Cyclic Sulfur Silanes may be used with other silanes in the formation of the rubber compound, including, but not limited to, silanes containing the following functional groups, mercapto, alkenyl, vinyl, acrylate, amino, methacrylate, isocyanato, epoxy, carbamato, polysulfide, thiocarabamato, thiocyanato, ureido, thiocarboxylate, and blocked mercptans. Preferably these silanes are dialkoxy or trialkoxy silanes. Specific silane groups include mercaptopropyl trialkoxy silane, bis(trialkoxysilylpropyl) disulfide, bis (trialkoxysilylpropyl) tetrasulfide, vinyl trialkoxysilane, oligomers of the foregoing, hydrolyzates of the foregoing and mixtures of the foregoing.

Exemplary of suitable rubber compositions are sulfur-vulcanizable synthetic rubber compositions. Representative examples of suitable rubber polymers include solution styrene-butadiene rubber (SSBR), styrene-butadiene rubber (SBR), natural rubber (NR), polybutadiene (BR), ethylene-propylene co- and ter-polymers (EP, EPDM), and acrylonitrile-butadiene rubber (NBR). The rubber composition preferably is comprised of at least one diene-based elastomer, or rubber. Suitable conjugated dienes are isoprene and 1,3-butadiene and suitable vinyl aromatic compounds are styrene and alpha methyl styrene. Thus, the rubber is a sulfur curable rubber. Such diene based elastomer, or rubber, may be selected, for example, from at least one of cis-1,4-polyisoprene rubber (natural and/or synthetic), and preferably natural rubber), emulsion polymerization prepared styrene/butadiene copolymer rubber, organic solution polymerization prepared styrene/butadiene rubber, 3,4-polyisoprene rubber, isoprene/butadiene rubber, styrene/isoprene/butadiene terpolymer rubber, cis-1,4-polybutadiene, medium vinyl polybutadiene rubber (35–50 percent vinyl), high vinyl polybutadiene rubber (50–75 percent vinyl), styrene/isoprene copolymers, emulsion polymerization prepared styrene/butadiene/acrylonitrile terpolymer rubber and butadiene/acrylonitrile copolymer rubber. An emulsion polymerization derived styrene/butadiene (E-SBR) might be used having a relatively conventional styrene content of 20 to 28 percent bound styrene or, for some applications, an E-SBR having a medium to relatively high bound styrene content, namely, a bound styrene content of 30 to 45 percent. Emulsion polymerization prepared styrene/butadiene/acrylonitrile terpolymer rubbers containing 2 to 40 weight percent bound acrylonitrile in the terpolymer are also contemplated as diene based rubbers for use in this invention.

See, any of U.S. Pat. No. 3,451,458, U.S. Pat. No. 5,110,969, U.S. Pat. No. 5,227,425 and U.S. Pat. No. 5,753,732, for examples of rubber compounds that can be improved with the invention with silica as a reinforcing agent. The disclosures of these patents are incorporated by reference in their entireties. Rubber compositions based on solution polymerized styrene butadiene are preferred.

The rubber compositions, in addition to at least one elastomer of synthetic or natural origin, will contain silica in amounts effective for reinforcing the rubber in its vulcanized state. The silica can be of the types known, for example described in U.S. Pat. No. 4,704,414, U.S. Pat. No. 5,227,425 and U.S. Pat. No. 5,753,732, and will be employed in amounts suitable for the reinforcing tires, especially those having low rolling resistance. The silica will be employed at a level of from about 5 to about 100 parts per hundred parts of rubber, preferably at least 30 parts silica. Higher or lesser amounts can be employed where appropriate. The "silica-reinforced rubber" compositions as can be improved by the invention do not exclude the presence of carbon black which will still be present as a preferred ingredient in minor amounts for purposes of coloring or as a carrier for additives, even including the silane coupling agents. In this latter regard, see U.S. Pat. No. 4,128,438 and U.S. Pat. No. 5,159,009, which are incorporated by reference in their entireties. The silica component will, however, be present in an amount greater than the carbon black in tires or tire rubber compounds.

Precipitated silicas are preferred fillers. The silica may be characterized by having a BET surface area, as measured using nitrogen gas, preferably in the range of 40 to 600, and more usually in a range of 50 to 300 $m^2/g$. The BET method of measuring surface area is described in the *Journal of the American Chemical Society*, Volume 60, page 304 (1930). The silica typically may also be characterized by having a dibutylphthalate (DBP) absorption value in a range of 100 to 350, and more usually 150 to 300. Further, the silica, as well as the aforesaid alumina and aluminosilicate, may be expected to have a CTAB surface area in a range of 100 to 220. The CTAB surface area is the external surface area as evaluated by cetyl trimethylammonium bromide with a pH of 9. The method is described in ASTM D 3849.

Mercury porosity surface area is the specific surface area determined by mercury porosimetry. For such technique, mercury is penetrated into the pores of the sample after a thermal treatment to remove volatiles. Set up conditions may be suitably described as using a 100 mg sample; removing volatiles during 2 hours at 105° C. and ambient atmospheric pressure; ambient to 2000 bars pressure measuring range. Such evaluation may be performed according to the method described in Winslow, Shapiro in ASTM bulletin, p.39 (1959) or according to DIN 66133. For such an evaluation, a CARLO-ERBA Porosimeter 2000 might be used. The average mercury porosity specific surface area for the silica should be in a range of 100 to 300 m$^2$/g.

The rubber composition may be compounded by methods known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, plasticizers, fillers, pigments, fatty acid, zinc oxide, waxes, antioxidants and antiozonants, peptizing agents, and reinforcing materials such as, for example, carbon black. Other suitable filler materials can be used, such as metal oxides, e.g., titanium dioxide, aluminosilicate and alumina, siliceous materials including clays and talc, and carbon black. Depending on the intended use of the sulfur vulcanizable and sulfur vulcanized material (rubbers), the additives mentioned above are selected and commonly used in conventional amounts.

A Rubber Composition May Prepared By a Process Such as By:
- (A) thermomechanically mixing, in at least one preparatory mixing step, to a temperature of 140° C. to 200° C., alternatively to 140° C. to 190° C., for a total mixing time of 2 to 20, alternatively 4 to 15, minutes for such mixing step(s)
    - (i) 100 parts by weight of at least one sulfur vulcanizable rubber selected from conjugated diene homopolymers and copolymers, and copolymers of at least one conjugated diene and aromatic vinyl compound, (ii) 5 to 100, preferably 25 to 80, phr (parts per hundred rubber) of particulate filler, wherein preferably the filler contains 1 to 85 weight percent carbon black (iii) 0.05 to 20 parts by weight filler of at least one cyclic sulfur silane;
- (B) subsequently blending therewith, in a final thermo-mechanical mixing step at a temperature to 50° C. to 130° C. for a time sufficient to blend the rubber, preferably between 1 to 30 minutes, more preferably 1 to 3 minutes, a curing agent at 0 to 5 phr; and optionally
- (C) curing said mixture at a temperature of 130 to 200° C. for about 5 to 60 minutes.

An exemplary process for using silane coupling agents to manufacture silica containing tires is disclosed in PCT/US98/17391, which is incorporated herein by reference.

The rubber compositions of the invention are employed to form tire parts, such as treads and sidewalls in the normal fashion as conventional silica-reinforced, sulfur vulcanizable rubber compositions. Typically, a rubber composition is shaped into parts of rough shape and then placed within a tire mold wherein they are heated to effect vulcanization. There are some cases wherein one or more tire parts will be partially vulcanized prior to assembly into the tire. It is an advantage of the invention that it applies well to these conventional techniques, without the need to modify blending or production procedures.

The following Examples are provided to further illustrate and explain a preferred form of the invention and are not to be taken as limiting in any regard. Unless otherwise indicated, all parts and percentages are by weight.

EXAMPLE I

Three norbornyl trithianes, namely 8-[(2-triethoxysilyl) ethyl]-3,4,5-trithiatricycl [5.2.1.0$^{2,6}$]decane, made by three different process were employed unpurified and purified in sulfur-vulcanizable, silica-reinforced rubber compositions and compared to rubber compositions containing one control with a commercial coupling agent (Silquest® A-1289 silane, a bis-3-(triethoxysilylpropyl)tetrasulfane silane) and one with no coupling agent.

Silane A Process.

Into a 250 ml round bottomed flask equipped with magnetic stir bar, condensor, thermocouple, heating mantle, and N$_2$ inlet was charged 2-(5-norbornenyl)-ethyltriethoxysilane (100.0 g, 0.35 moles), S$_8$ (33.8 g, 1.05 moles), and 2-(3-cyclohexenyl)-ethyltrichlorosilane (1.5 ml, approximately 1 mole % based on silane). The contents of the flask were heated to 160° C. for 3 hours, then allowed to cool to room temperature. The resulting dark liquid was filtered through a 0.5-micron filter using a pressure filter apparatus. The filtrate weighed 125.9 g, giving a yield of 94%.

Process—Silane B

Into a 2-liter three-necked flask equipped with a mechanical stirrer, a condenser and a thermometer were charged 1230 grams of N, N-dimethyl formamide (DMF) and 236 grams of sulfur flower. The contents were stirred and ammonia gas from a cylinder was bubbled into the mixture at 61 ml/minute for 20 minutes (total 1220 ml or 0.49 mole). Then, 491.5 grams (2.29 mole) of trimethoxynorbornenyl-silane were added and the contents were heated to 110° C. for 2 hours. The contents were cooled to 60° C. and the solvent, dimethyl formamide (DMF), was stripped under vacuum. Essentially quantitative recovery of DMF (1228 grams) was observed. The crude product was then distilled using a Kugelrohr distillation apparatus to give a clear, light yellow liquid.

Process—Silane C

Same as the Process for Silane B but was not distilled.

The ingredients listed in Table 1 were mixed with a silane as called for in Table 2, as follows in a "B" BANBURY® (Farrel Corp.) mixer with a 103 cu. in. (1690 cc) chamber volume. The mixing of a rubber masterbatch was done in two steps. The mixer was turned on with the mixer at 120 rpm and the cooling water on full. The rubber polymers were added to the mixer and ram down mixed for 30 seconds. Half of the silica and all of the silane, with approximately 35–40 grams of this portion of silica in an ethylvinyl acetate (EVA) bag, were added and ram down mixed for 30 seconds. The remaining silica and the oil in an EVA bag were next added and ram down mixed for 30 seconds. The mixer throat was thrice dusted down and the mixture ram down mixed for 15 seconds each time. The mixer's mixing speed was increased to 160 or 240 rpm, as required to raise the temperature of the rubber masterbatch to between 160 and 165° C. in approximately 1 minute. The masterbatch was dumped (removed from the mixer), a sheet was formed on a roll mill set at about 50 to 60° C., and then allowed to cool to ambient temperature.

The rubber masterbatch was added to the mixer with the mixer at 120 rpm, cooling water turned on full, and ram down mixed for 30 seconds. The remainder of the ingredients was added and ram down mixed for 30 seconds. The mixer throat was dusted down, the mixer speed increased to 160 or 240 rpm so that the contents reached a temperature between 160 and 165° C. in approximately 2 minutes. The rubber masterbatch was mixed for 8 minutes and the speed of the BANBURY mixer was adjusted to maintain the temperature between 160 and 165° C. The masterbatch was dumped (removed from the mixer), a sheet was formed on a roll mill set at about 50 to 60° C., and then allowed to cool to ambient temperature.

The rubber masterbatch and the curatives were mixed on a 6 in.×13 in. (15 cm×33 cm) two roll mill that was heated to between 50 and 60° C. The sulfur and accelerators were added to the rubber masterbatch and thoroughly mixed on the roll mill and allowed to form a sheet. The sheet was cooled to ambient conditions for 24 hours before it was cured. The rheological properties were measured on a Monsanto R-100 Oscillating Disk Rheometer and a Monsanto M1400 Mooney Viscometer. The specimens for measuring the mechanical properties were cut from 6 mm plaques cured for 35 minutes at 160° C. or from 2 mm plaques cured for 25 minutes at 160° C.

The following tests were conducted with the following methods (in all examples): Mooney Scorch @ 135° C. (ASTM Procedure D1646); Mooney Viscosity @ 100° C. (ASTM Procedure D1646); Oscillating Disc Rheometer (ODR) @ 149° C., 1° arc, (ASTM Procedure D2084); Physical Properties, cured t90 @ 149° C. (ASTM Procedures D412 and D224) (G' and G" in dynes/cm$^2$); DIN Abrasion, mm$^3$ (DIN Procedure 53516); and Heat Build (ASTM Procedure D623).

TABLE 1

Model Low Rolling Resistance Tread Formulation

| PHR | Ingredient |
|---|---|
| 75 | SSBR, solution polymerized styrene butadiene rubber (12% styrene, 46% vinyl, T$_g$: 42° C.) |
| 25 | BR, butadiene rubber (98% cis, T$_g$: 104° C.) |
| 80 | Silica (150–190 m$_2$/gm, ZEOSIL 1165MP, Rhone-Poulenc) |
| 32.5 | Aromatic process oil (high viscosity, Sundex 8125, Sun) |
| 2.5 | Zinc oxide (KADOX 720C, Zinc Corp) |
| 1 | Stearic acid (INDUSTRENE, Witco) |
| 2 | 6PPD antiozonant (SANTOFLEX 6PPD, Flexsys) |
| 1.5 | Microcrystalline wax (M-4067, Schumann) |
| 3 | N330 carbon black (Engineered Carbons) |
| 1.4 | Sulfur(#104, Sunbelt) |
| 1.7 | CBS accelerator (SANTOCURE, Flexsys) |
| 2 | DPG accelerator (PERKACIT DPG-C, Flexsys) |
| 0–10.1 | Silane coupling agent |

TABLE 2

Properties of Trithiane Silanes in Silica-filled Rubber

| Silane | None | A-1289 | Silane C | Silane A | Silane B |
|---|---|---|---|---|---|
| Preparation | | | Stripped; Undistilled | Acid Catalyzed | Kugel Rohr distilled |
| Silane Loading (phr) | 0 | 7 | 10.1 | 10.1 | 10.1 |
| Rheometer (ODR) Properties | | | | | |
| (1° arc at 149° C.) | | | | | |
| ML(lb-in) | 23.8 | 9 | 9.3 | | 8.3 |
| MH(lb-in)(30 min. timer) | 39.4 | 28.9 | 30.5 | | 27.4 |
| T90(min)(30 min. timer) | 10.5 | 16.6 | 18.5 | 16.8 | 18.4 |
| Ts1(min) | 5.4 | 4.9 | 5.6 | 6.0 | 5.3 |
| Mooney Properties | | | | | |
| Viscosity at 100° C. (ML1+4) | 124 | 69 | 86 | 79 | 75 |
| MV at 135° C. (MS1+) | | 40.6 | 45.3 | | 38.9 |
| Scorch at 135° C. (MS1+t3) (min) | 9.5 | 6.9 | 7.7 | 10.2 | 8 |
| Cure at 135° C. (MS1°t18) (min) | 11 | 9.5 | 9.9 | 13.0 | 10.2 |
| Physical Properties | | | | | |
| (cured t90 at 149° C.) | | | | | |
| Tensile (psi) | 2170 | 3083 | 3144 | 3142 | 3374 |
| Elongation (%) | 830 | 430 | 424 | 526 | 523 |
| 100% Modulus (psi) | 170 | 266 | 310 | 315 | 242 |
| 200% Modulus (psi) | 280 | 791 | 930 | 784 | 654 |
| 300% Modulus (psi) | 470 | 1777 | 1939 | 1492 | 1450 |
| Hardness (Shore A) | 64 | 57 | 60 | 65 | 58 |
| Abrasion Loss (DIN) (mm) | 160 | 74 | 76 | | 113 |
| Dynamic Properties | | | | | |
| (Torsion Rect. at 0.15% strain) | | | | | |
| Tan Delta | | | | | |
| 0° C., 1 Hz | | | 0.1477 | 0.1510 | 0.1340 | 0.1582 |
| 0° C., 10 Hz | | 0.1070 | 0.2093 | 0.1991 | 0.1580 | 0.1993 |
| 60° C., 1 Hz | | 0.076 | 0.0803 | 0.1060 | 0.1009 | |
| 60° C., 10 Hz | | 0.088 | 0.092 | 0.0948 | 0.1053 | 0.1080 |
| Ratio 0° C./60° C., 1 Hz | | | 1.9430 | 1.8800 | 1.264 | 1.5680 |

TABLE 2-continued

Properties of Trithiane Silanes in Silica-filled Rubber

| Silane | None | A-1289 | Silane C | Silane A | Silane B |
|---|---|---|---|---|---|
| Ratio 0° C./60° C., 10 Hz | 1.2200 | 2.2750 | 2.1000 | 1.500 | 1.8450 |
| $G'$ (dyn/cm$^2$) ($\times 10^7$) | | | | | |
| 0° C., 1 Hz | 4.8443 | 8.4879 | | 9.4139 | |
| 0° C., 10 Hz | 26.8000 | 6.0439 | 10.6180 | | 11.8030 |
| 60° C., 1 Hz | | 2.5330 | 3.5569 | | 3.4790 |
| 60° C., 10 Hz | 12.7000 | 2.8693 | 4.0318 | | 4.0664 |
| $G''$ (dyn/cm$^2$) ($\times 10^7$) | | | | | |
| 0° C., 1 Hz | | 0.7156 | 1.2817 | | 1.4892 |
| 0° C., 10 Hz | 2.8700 | 1.2651 | 2.1137 | | 2.3521 |
| 60° C., 1 Hz | 0.1925 | 0.2855 | | 0.3509 | |
| 60° C., 10 Hz | 1.1200 | 0.2639 | 0.3823 | | 0.4393 |
| (Torsion Rect. at 3% strain) | | | | | |
| Tan Delta | | | | | |
| 0° C., 1 Hz | | 0.2282 | 0.2808 | | 0.3013 |
| 0° C., 10 Hz | | 0.3082 | 0.3594 | | 0.3712 |
| 60° C., 1 Hz | | 0.1179 | 0.1516 | | 0.1793 |
| 60° C., 10 Hz | | 0.1345 | 0.1657 | | 0.1951 |
| Ratio 0° C./60° C., 1 Hz | | 1.936 | 1.852 | | 1.680 |
| Ratio 0° C./60° C., 10 Hz | | 2.291 | 2.169 | | 1.903 |
| $G''$ (dyn/cm$^2$) ($\times 10^7$) | | | | | |
| 0° C., 1 Hz | | 3.2877 | 4.759 | | 5.077 |
| 0° C., 10 Hz | | 4.0616 | 5.8025 | | 6.1919 |
| 60° C., 1 Hz | | 1.9538 | 2.6767 | | 2.5410 |
| 60° C., 10 Hz | | 2.2315 | 2.9782 | | 2.8982 |
| $G''$ (dyn/cm$^2$) ($\times 10^7$) | | | | | |
| 0° C., 1 Hz | | 0.7503 | 1.3364 | | 1.5299 |
| 0° C., 10 Hz | | 1.2519 | 2.0857 | | 2.2987 |
| 60° C., 1 Hz | | 0.2304 | 0.4058 | | 0.4555 |
| 60° C., 10 Hz | | 0.3001 | 0.4936 | | 0.5654 |
| Goodrich Flexometer at 212°F., 17.5% compression 143 psi static load. 25 min. run | | | | | |
| Heat Build-up (Delta T) (°F.) | 66 | 23 | 21 | | 25 |
| Permanent Set (%) | Delam. at 6 min. | 8.6 | 8.1 | | 10.5 |

The above description is intended to enable the person skilled in the art to practice the invention. It is not intended to detail all of the possible modifications and variations which will become apparent to the skilled worker upon reading the description. It is intended, however, that all such modifications and variations be included within the scope of the invention which is defined by the following claims. The claims are meant to cover the indicated elements and steps in any arrangement or sequence which is effective to meet the objectives intended for the invention, unless the context specifically indicates the contrary.

What is claimed is:

1. A process for preparing sulfur-vulcanized, silica-reinforced tires, comprising:

preparing a sulfur-vulcanizable, silica-reinforced rubber composition by blending rubber, sulfur, silica and a coupling agent comprising a sulfur-containing norbornanyl silicon compound of the following structure

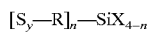

wherein each X is chosen from monovalent hydrocarbon groups or hydrolyzable groups, y is 1 to 5, when y is 1 the compound is an episulfide, and when y is 2 to 5 the sulfur atoms form a polysulfide wherein each sulfur atom is bonded to another sulfur atom and the terminal valences of the polysulfide are bonded to vicinal carbon atoms; n is 1, 2 or 3; R is a polyvalent polycycloaliphatic hydrocarbon radical; and heating to vulcanize the rubber composition.

2. A process for preparing sulfur-vulcanized, silica-reinforced tires, according to claim 1 wherein the coupling agent comprises a member selected from the group consisting of:

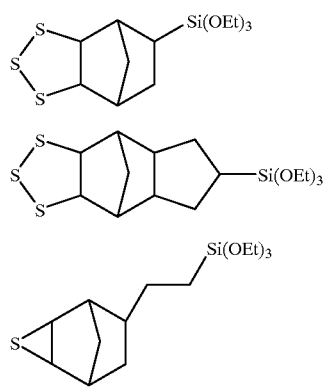

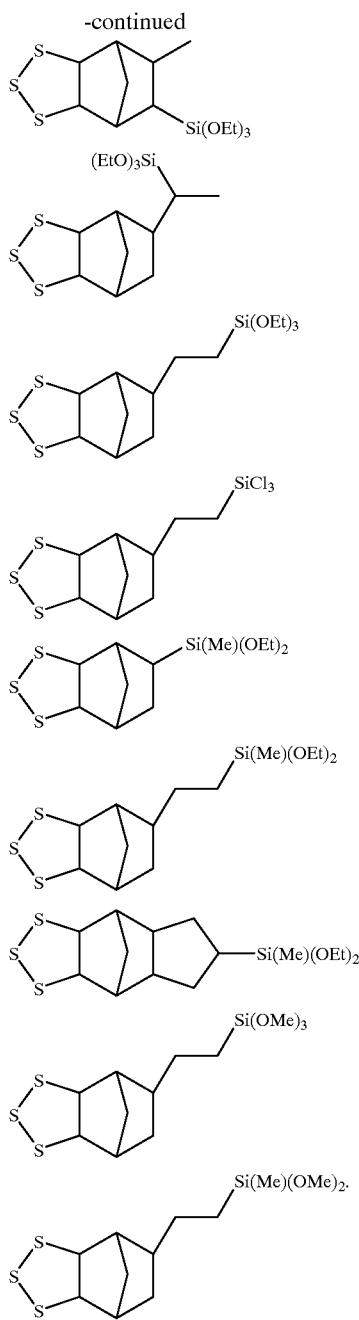

3. A process for preparing sulfur-vulcanized, silica-reinforced tires, according to claim 1 wherein the coupling agent is employed at a level of from 2 to about 20 parts by weight per 100 parts of rubber and the silica is employed at a level of from 30 to about 100 parts by weight per 100 parts of rubber, the ratio by weight of silica to silane being in the range of from 4:1 to about 40:1.

4. A process for preparing sulfur-vulcanized, silica-reinforced tires, according to claim 1 wherein the coupling agent is comprised in the liquid reaction mixture prepared by the following process:

reacting sulfur with an unsaturated silicon compound of the formula $$[R^3]_n\text{—SiX}_{4-n}$$

where $R^3$ is a polycycloaliphatic group containing at least one reactive strained double bond and each X is as defined in claim 1, the sulfur and silicon compound being reacted in the presence of an acid catalyst.

5. A process for preparing sulfur-vulcanized, silica-reinforced tires, according to claim 4 wherein the acid catalyst is defined by the formula $$[R^3]_n\text{—SiX}\epsilon_{4-n}$$

wherein at least one of X$\epsilon$ is occupied by a halogen, and the remainder are as defined for X, and $R^3$ is a polycycloaliphatic group containing at least one reactive strained double bond; and wherein the molar ratio of the unsaturated silicon compound to chlorosilane is within the range of from 1000:1 to 10:1 and the molar ratio of unsaturated silane to elemental sulfur is within the range of from 1:3 to 1:4.

6. A process according to claim 5 wherein R is selected from the group consisting of (a)
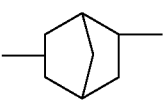

(b)
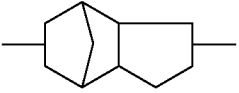

(c)
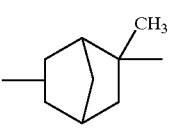

(d)
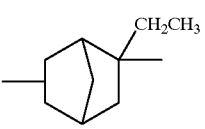

(e)
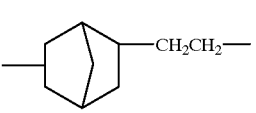

(f)
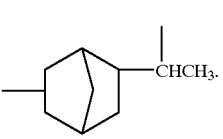

7. A process according to claim 5 wherein the halogen of the acid catalyst is chlorine.

8. A process according to claim 6 wherein the reaction is conducted at a temperature above 150° C. at a pressure near ambient.

9. A vulcanized tire prepared according to the process of claim 1.

10. A process for preparing sulfur-vulcanizable, silica-reinforced, shaped tire, comprising:

preparing a sulfur-vulcanizable, silica-reinforced rubber composition by blending rubber, sulfur, silica and a coupling agent comprising a sulfur-containing norbornanyl silicon compound of the following structure

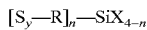

wherein each X is chosen from monovalent hydrocarbon groups or hydrolyzable groups, y is 1 to 5, when y is 1 the compound is an episulfide, and when y is 2 to 5 the sulfur atoms form a polysulfide wherein each sulfur atom is bonded to another sulfur atom and the terminal valences of the polysulfide are bonded to vicinal carbon atoms; n is 1, 2 or 3; R is a polyvalent polycycloaliphatic hydrocarbon radical; and forming the rubber composition into a the shape of a tire or portion of a tire.

11. A process according to claim 10 wherein the coupling agent is employed at a level of from 2 to about 20 parts by weight per 100 parts of rubber and the silica is employed at a level of from 30 to about 100 parts by weight per 100 parts of rubber, the ratio by weight of silica to silane being in the range of from 4:1 to about 40:1.

12. A process according to claim 10 wherein the coupling agent is comprised in the liquid reaction mixture prepared by the following process:

reacting sulfur with an unsaturated silicon compound of the formula

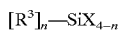

where $R^3$ is a polycycloaliphatic group containing at least one reactive strained double bond and each X is as defined in claim 1, the sulfur and silicon compound being reacted in the presence of an acid catalyst.

13. A process according to claim 12 wherein the acid catalyst is defined by the formula

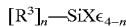

wherein at least one of $X\epsilon$ is occupied by a halogen, and the remainder are as defined for X, and $R^3$ is a polycycloaliphatic group containing at least one reactive strained double bond; and wherein the molar ratio of the unsaturated silicon compound to chlorosilane is within the range of from 1000:1 to 10:1 and the molar ratio of unsaturated silane to elemental sulfur is within the range of from 1:3 to 1:4.

14. A process according to claim 13 wherein R is selected from the group consisting of

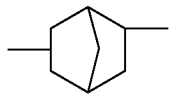

(a)

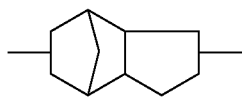

(b)

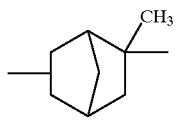

(c)

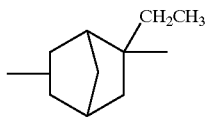

(d)

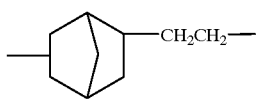

(e)

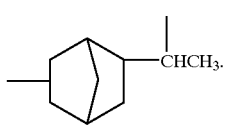

(f)

15. A process according to claim 13 wherein the halogen of the catalyst is chlorine.

16. A process according to claim 13 wherein the reaction is conducted at a temperature above 150° C. at a pressure near ambient.

17. A product prepared according to the process of claim 11.

18. A process for preparing sulfur-vulcanizable, silica-reinforced, tire rubber composition, comprising: blending rubber, sulfur, silica and a coupling agent comprising a sulfur-containing norbornanyl silicon compound of the following structure

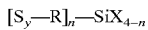

wherein X is chosen from monovalent hydrocarbon groups or hydrolyzable groups, y is 1, to 5, when y is 1 the compound is an episulfide, and when y is 2 to 5 the sulfur atoms form a polysulfide wherein each sulfur atom is bonded to another sulfur atom and the terminal valences of the polysulfide are bonded to vicinal carbon atoms; n is 1, 2 or 3; R is a polyvalent polycycloaliphatic hydrocarbon radical.

19. A process according to claim 18 wherein the coupling agent is employed at a level of from 2 to about 20 parts by weight per 100 parts of rubber and the silica is employed at a level of from 30 to about 100 parts by weight per 100 parts of rubber, the ratio by weight of silica to silane being in the range of from 4:1 to about 40:1.

20. A process according to claim 18 wherein the coupling agent is comprised in the liquid reaction mixture prepared by the following process:

reacting sulfur with an unsaturated silicon compound of the formula

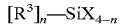

where $R^3$ is a polycycloaliphatic group containing at least one reactive strained double bond and each X is as defined in claim 1, the sulfur and silicon compound being reacted in the presence of an acid catalyst.

21. A process for preparing sulfur-vulcanized, silica-reinforced tires, according to claim 20 wherein the acid catalyst is defined by the formula

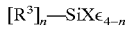

wherein at least one of $X\epsilon$ is occupied by a halogen, and the remainder are as defined for X, and $R^3$ is a polycycloaliphatic group containing at least one reactive strained double bond; and wherein the molar ratio of the unsaturated silicon compound to chlorosilane is within the range of from 1000:1 to 10:1 and the molar ratio of unsaturated silane to elemental sulfur is within the range of from 1:3 to 1:4.

22. A process according to claim 21 wherein R is selected from the group consisting of

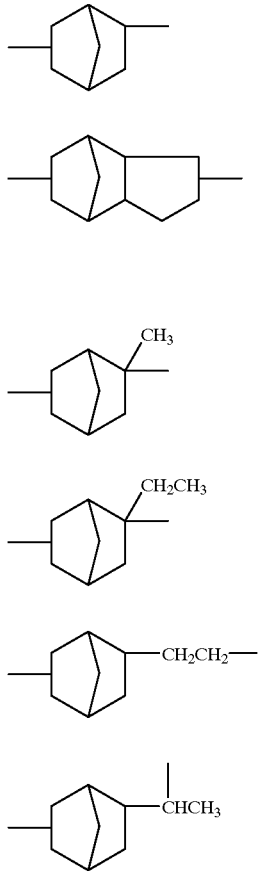

(a)

(b)

(c)

(d)

(e)

(f)

23. A process according to claim 21 wherein the halogen of the acid catalyst is chlorine.

24. A process according to claim 21 wherein the reaction is conducted at a temperature above 150° C. at a pressure near ambient.

25. A product prepared according to the process of claim 18.

26. A product according to claim 25, wherein the coupling agent comprises a member selected from the group consisting of:

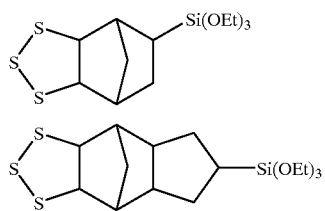

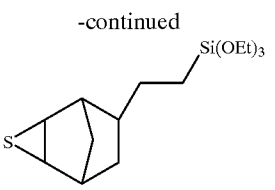

-continued

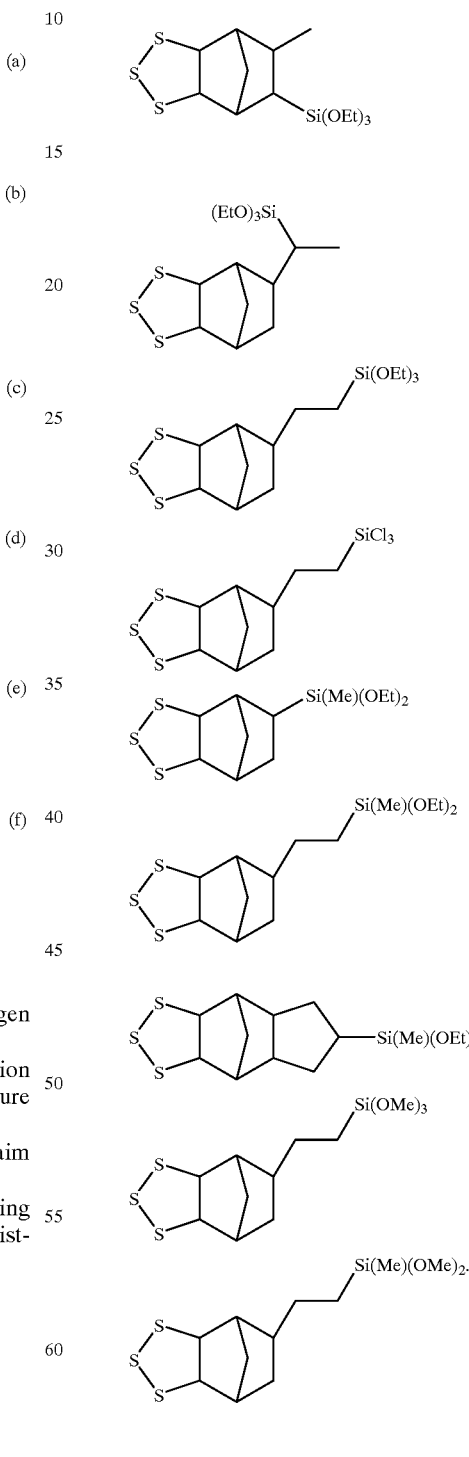

* * * * *